US012438319B2

(12) United States Patent
Powers

(10) Patent No.: US 12,438,319 B2
(45) Date of Patent: Oct. 7, 2025

(54) SYSTEMS AND METHODS FOR ELECTRICAL LINE COUPLING IN ILLUMINATION DISPLAYS

(71) Applicant: Michael Powers, Fort Worth, TX (US)

(72) Inventor: Michael Powers, Fort Worth, TX (US)

( * ) Notice: Subject to any disclaimer, the term of this patent is extended or adjusted under 35 U.S.C. 154(b) by 339 days.

(21) Appl. No.: 18/348,860

(22) Filed: Jul. 7, 2023

(65) Prior Publication Data

US 2024/0011516 A1 Jan. 11, 2024

Related U.S. Application Data

(60) Provisional application No. 63/367,867, filed on Jul. 7, 2022.

(51) Int. Cl.

| | |
|---|---|
| ***H01R 33/94*** | (2006.01) |
| ***F21S 4/10*** | (2016.01) |
| ***H01R 13/443*** | (2006.01) |
| ***H01R 13/73*** | (2006.01) |
| ***H01R 33/02*** | (2006.01) |

(52) U.S. Cl.

CPC ................ *H01R 33/94* (2013.01); *F21S 4/10* (2016.01); *H01R 13/443* (2013.01); *H01R 13/73* (2013.01); *H01R 33/02* (2013.01)

(58) Field of Classification Search

CPC ..... H01R 33/94; F21V 21/005; F21V 23/005; F21V 21/00

USPC ............................................ 362/249.01, 382

See application file for complete search history.

(56) References Cited

U.S. PATENT DOCUMENTS

| | | | | |
|---|---|---|---|---|
| 2001/0003505 A1* | 6/2001 | Bertrand | ................ | A63H 27/10 362/101 |
| 2011/0164409 A1* | 7/2011 | Smith | ....................... | F21S 4/10 29/428 |
| 2015/0078000 A1* | 3/2015 | Chen | ......................... | F21S 4/10 362/249.16 |
| 2021/0247058 A1* | 8/2021 | Robbins | ................ | F21V 21/088 |

* cited by examiner

*Primary Examiner* — Edwyn Labaze

(57) ABSTRACT

An electrical line coupling system is presented. The coupling system can include a string light system that includes a fastening system, fastening device, string light kit, coupling system, mounted coupling system, and/or connection apparatus. The coupling system can leverage components and/or designs of electrical lines (e.g., plugs, connectors, sockets, etc.) to facilitate coupling of the electrical line to an object and/or surface.

10 Claims, 18 Drawing Sheets

SYSTEMS AND METHODS FOR ELECTRICAL LINE COUPLING IN ILLUMINATION DISPLAYS

CROSS-REFERENCE TO RELATED APPLICATIONS

None.

STATEMENT OF FEDERALLY SPONSORED RESEARCH OR DEVELOPMENT

None.

REFERENCE TO A SEQUENCE LISTING, A TABLE, OR A COMPUTER LISTING COMPACT DISC APPENDIX

None.

TECHNICAL FIELD

The present disclosure relates generally to electrical illumination, such as via light strands and/or stringed lights (e.g., Christmas lights, etc.). Specifically, the present disclosure relates to systems, methods, and apparatuses for coupling electrical lines in illumination displays.

BACKGROUND

Electrical lines are essential to modern society. Whether used in an industrial setting to promulgate power to different building locations, or to decorate a dwelling for the holidays, electrical lines are a basic necessity for power transmission. Electrical lines such as stringed lights, extension cables, appliance cords, etc. are often located above ground. In many scenarios, it is desirable to couple an exposed electrical line with a surface or object, such as to facilitate the securing of the line above the ground. This can increase safety by minimizing hazardous placement, and such coupling can also be essential for intended function of particular electrical lines, such as sting lights. It can often be difficult to accomplish coupling of electrical lines to surfaces and/or objects—the fact that the line carries an active electrical current obviates the possibility of rupturing the structural integrity of the line to accomplish the coupling, such as would occur through stapling, nailing, etc. Further, electrical lines can have several layers that can hinder line elasticity, and while the material (e.g., metal, rubber, plastic, etc.) of the lines can be flexible, tying a line into a knot or otherwise over-distorting an electrical line can cause line crimping, potentially leading to current disruption or dangerous exposed wiring.

SUMMARY

In one embodiment, the present disclosure can include an electrical line coupling system. The coupling system can include a string light system that includes a fastening system, fastening device, string light kit, coupling system, mounted coupling system, and/or connection apparatus. The coupling system can leverage components and/or designs of electrical lines (e.g., plugs, connectors, sockets, etc.) to facilitate coupling of the electrical line to an object and/or surface. In another embodiment, the present disclosure can include a string light system in accordance with one or more embodiments of the present disclosure. In another embodiment, the present disclosure can include a fastening system in accordance with one or more embodiments of the present disclosure. In another embodiment, the present disclosure can include a fastening device in accordance with one or more embodiments of the present disclosure. In another embodiment, the present disclosure can include a string light kit including a fastening system in one or more embodiments of the present disclosure. In another embodiment, the present disclosure can include a coupling system in accordance with one or more embodiments of the present disclosure. In another embodiment, the present disclosure can include a mounted coupling system in accordance with one or more embodiments of the present disclosure. In another embodiment, the present disclosure can include a connection apparatus in accordance with one or more embodiments of the present disclosure.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1A:
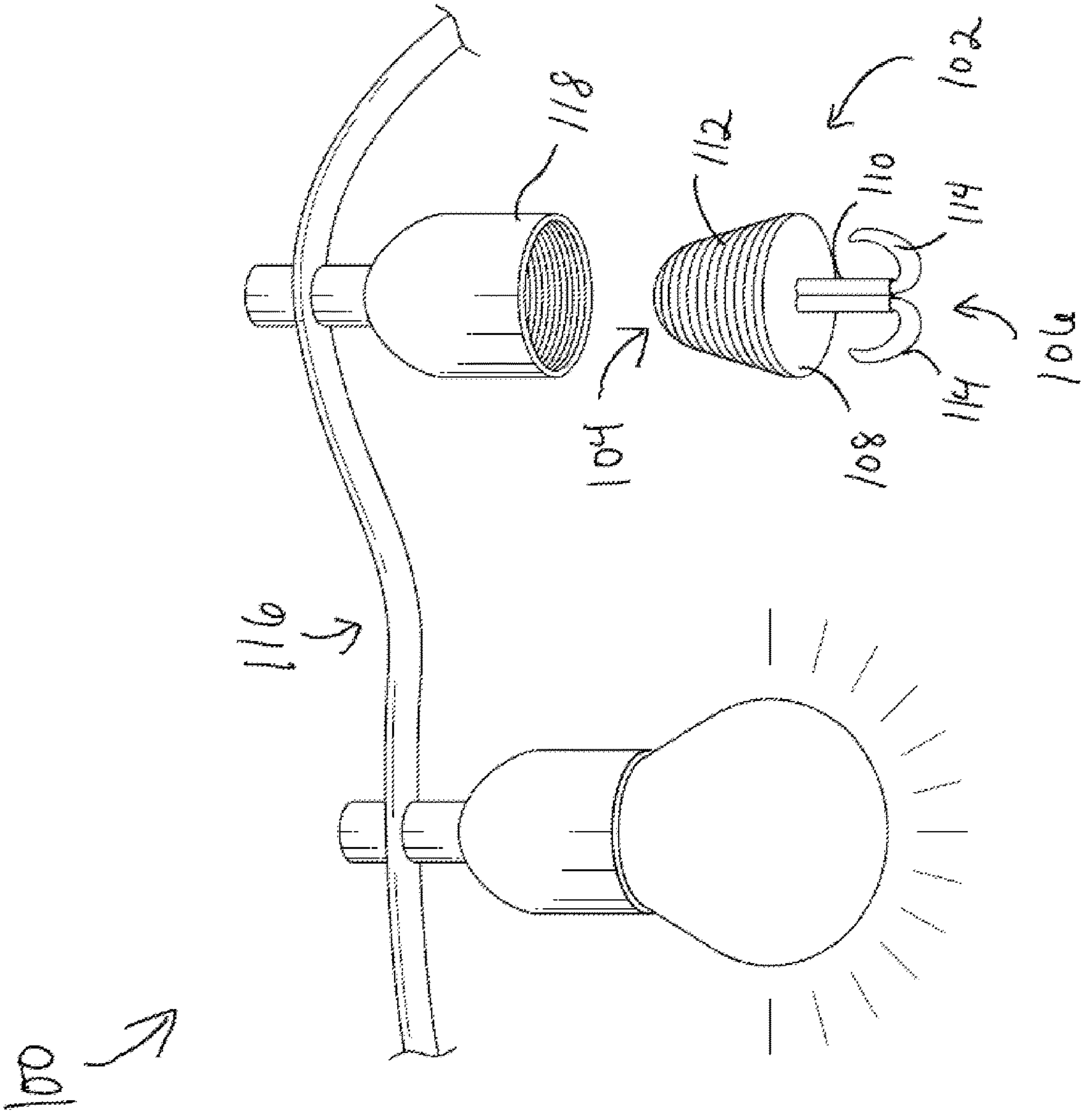
FIGS. 1A-1C illustrate a string light system in accordance with one or more exemplary embodiments of the present disclosure.
Figure 1B:
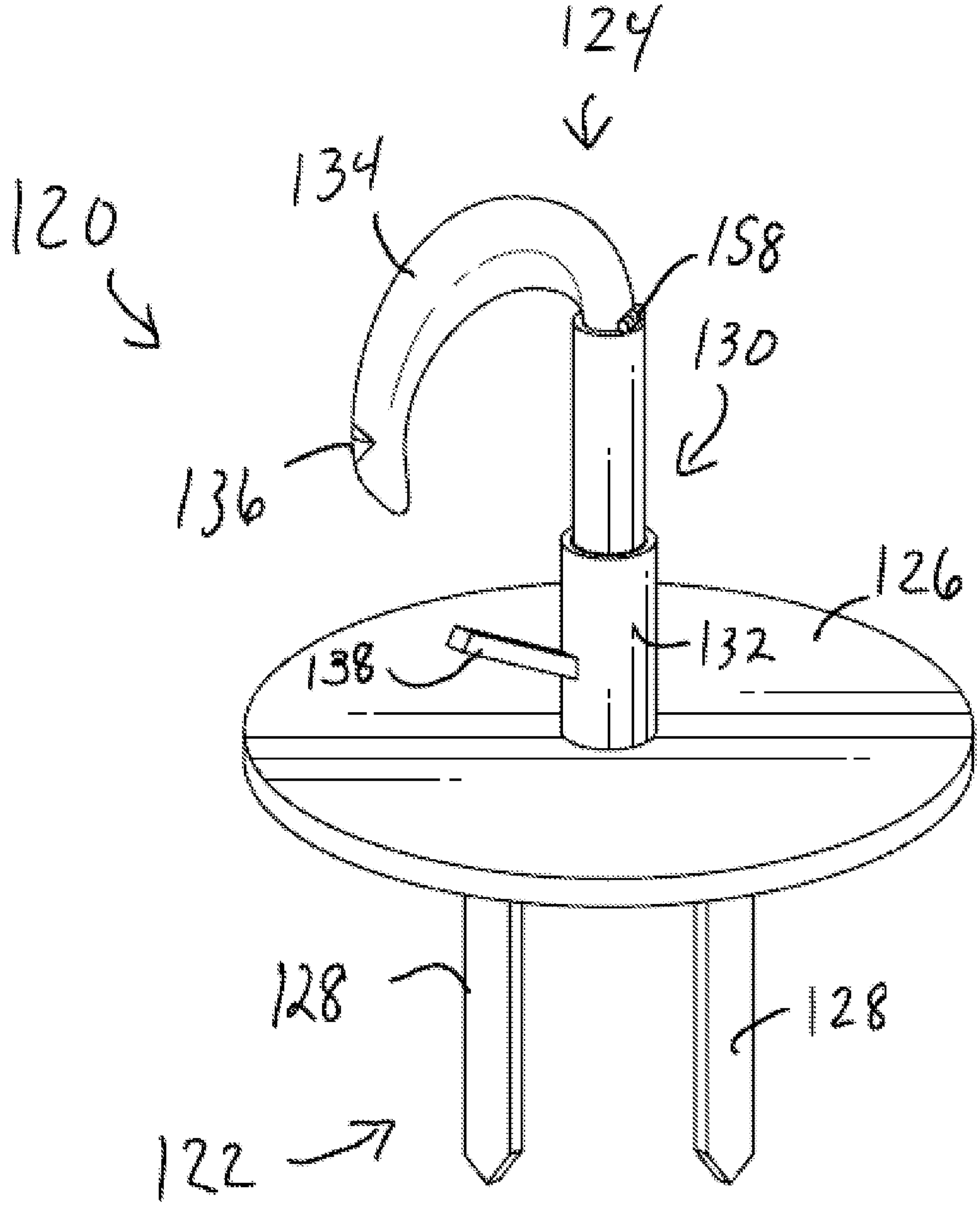
Figure 1C:
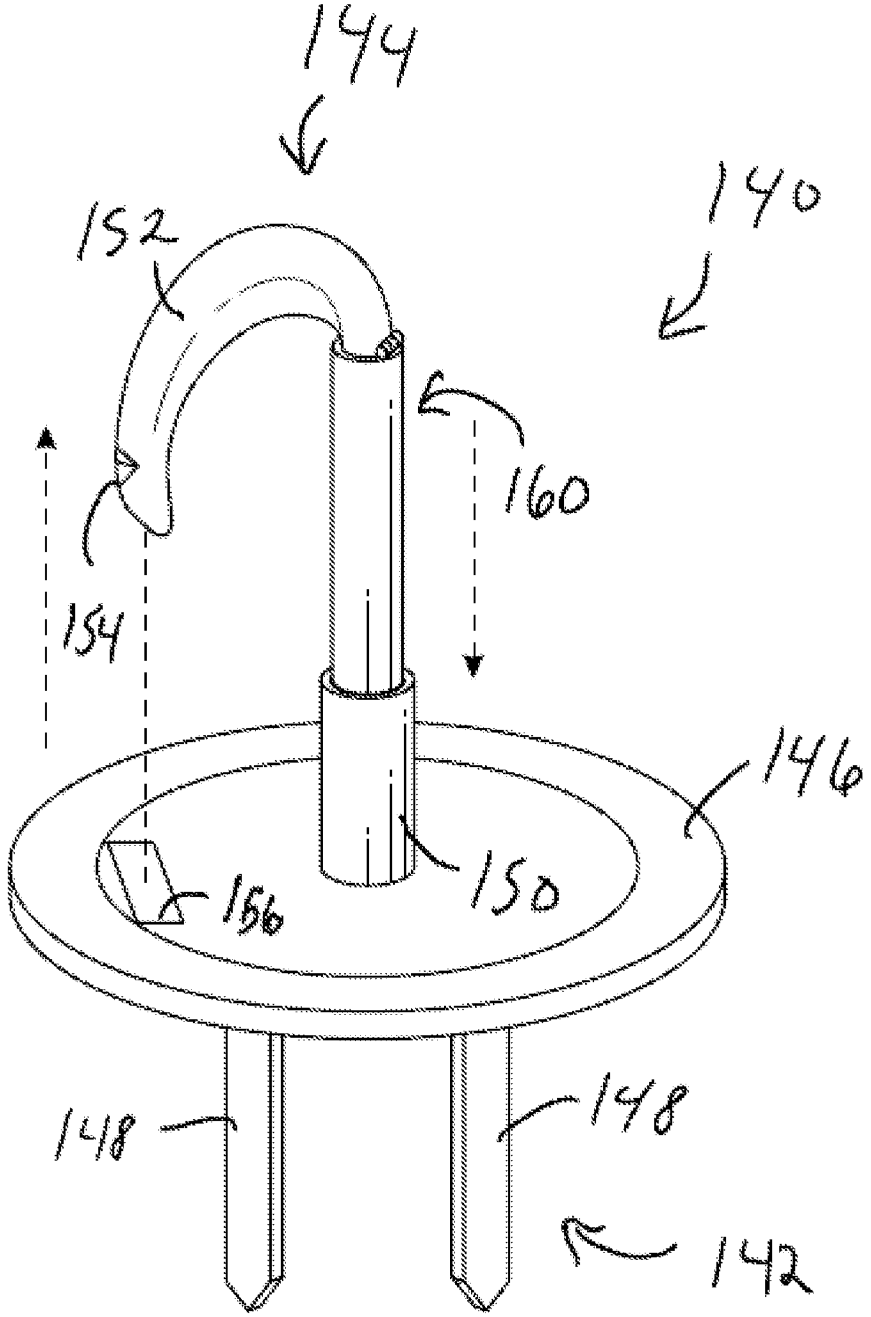

FIGS. 1A-1C illustrates a perspective view of a string light system 100. In one embodiment, the system 100 can include coupling member 102 and a strand member 116. For example, the strand member 116 can include one or more sockets 118, such as a socket that can receive a light bulb and/or a coupling member 102. In another embodiment, the coupling member 102 can include a first end 104 and a second end 106. In one embodiment, the first end 104 can include a coupling mechanism 112. In one example, the coupling mechanism can be configured to couple to a light strand, e.g., strand member 116. In one embodiment, the first end 104 can include e.g., threads 112, configured to couple with a socket 118 of a light strand. For example, the coupling mechanism 112 can be configured similarly to threads of a light bulb. In another embodiment, the coupling mechanism 112 can be a latch, stopper, clamp, quick-connect, or any other mechanism suitable to couple the coupling member 102 to the strand member 116. In another embodiment, the second end 106 can include a fastener. For example, the second end 106 can include one or more hook members 114 coupled to a surface 108 of the second end 106, such as via elongated member 110. In another embodiment, the fastener of the second end 106 can be a clamp, Velcro®, hook, or any other mechanism suitable to allow the coupling member 102 (and/or attached strand member 116) to couple with, e.g., a surface, tree branch, string, wire, and/or strand, including, e.g., the strand member 116 or other strand.

In another embodiment, and as depicted in FIG. 1B, a coupling member 120 can be similar to coupling member 102, but be configured to couple with, e.g., an end of a strand member 116, as opposed to, e.g., a socket 118 of a strand member 116. For example, a coupling member 120 can include a first end 122 that can be configured to couple with a strand member 116, such as via insertion into a female electrical plug and/or female electrical connector. In one embodiment, the first end 122 can include one or more prongs 128 configure to engage a female electrical plug. In another embodiment, the first end 122 can include any other mechanism suitable to couple with a light strand, such as an end of a light strand. In another embodiment, the first end 122 can include any mechanism suitable to couple with an end of a light strand, whether male and/or female, including loops, clamps, recesses, holes, hooks, or any other suitable mechanism. In another embodiment, the coupling member 120 can include a central member 126. In one example, the central member 126 can be a plate configured to be disposed between the first end 122 and the second end 124. In another embodiment, the central member 126 can be a surface (e.g., similar to surface 108) configured to couple with the first end 122 and/or the second end 124. In another embodiment, the coupling member 120 can include a second end 124. For example, the second end 124 can include a fastener 130. The fastener 130 can include any mechanism suitable to couple the coupling member 120 with, e.g., a surface, tree branch, string, wire, and/or strand, including, e.g., the strand member 116 or other strand. For example, the fastener 130 can include a hook 134. In another example, the hook 134 can be coupled with the central member 126, such as via base 132. In another embodiment, the hook 134 can include a stabilizing mechanism, such as to stabilize the fastener in a fastened position. For example, the fastener 130 can include a notch 136 configured to receive a clasp 138. In another embodiment, the fastener 130 can include a hinge 158, such that the hook 134 can be mobilized along the axis of the hinge, such as to allow the notch 136 to engage with the clasp 138.

In another embodiment, and as illustrated in FIG. 0.1C, a coupling member 140 can be similar to coupling member 124, including a first end 142 with a coupling mechanism 148 (e.g., prongs 148) configured to couple with an end of a light strand; a second end 144 including a fastener 160; and a central member 146. In one embodiment, the fastener 160 can include a hook member 152 coupled with the central member 146, such as via base 150. In another embodiment, the hook 152 can be configured to be extended away from the central member 146 and be mobilized back towards the central member 146. In another embodiment, the central member 146 can include an aperture 156 configured to receive the hook 152. In another embodiment, the hook 152 can include a notch 154 configured to engage the aperture 156, such that the fastener 160 can be stabilized when the notch 154 engages the aperture 156. For example, the fastener 160 can be "locked" when the notch 154 engages the aperture 156. In one embodiment, the coupling members 102, 120, 140 discussed herein can be made of plastic, polymer, metal, or any other suitable material.

FIGS. 2A-2E depict another embodiment of the present disclosure. A fastening system 200 can include a first member 202 and a second member 204. In one embodiment, the first member 202 can be configured to couple with an elongated objected 222 (e.g., a strand, cord, rope, light strand, etc.) and further couple with another object 206. For example, the first member 202 can be configured to couple with a strand 222 and further couple with an end 206 of the strand 222 or a different strand. In one embodiment, the first member 202 can be configured to couple with a connector 206 of a strand, e.g., a female connector 206 or a male connector. In another embodiment, the second member 204 can be configured to couple to the first member 202.

Figure 2A:
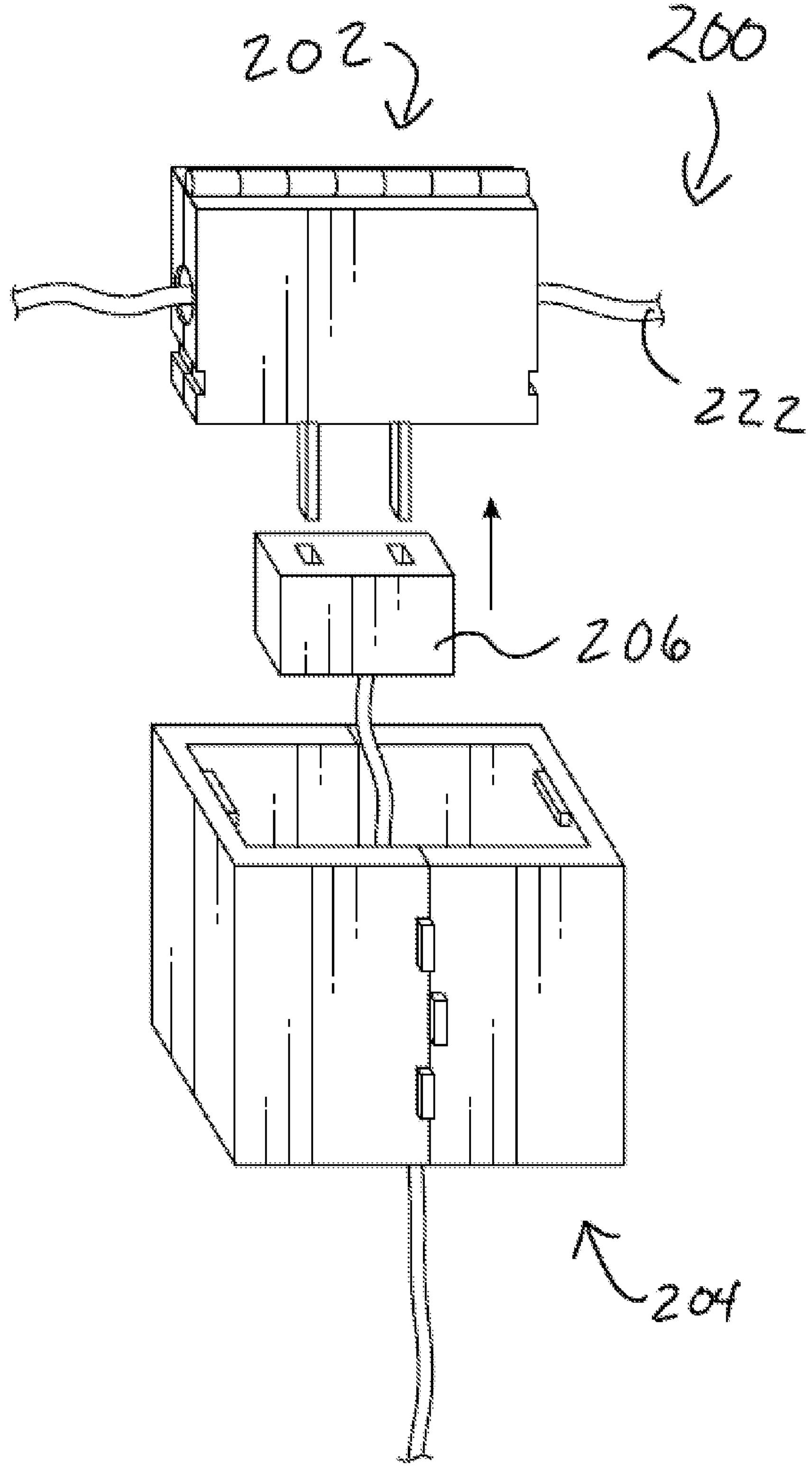
FIGS. 2A-2E illustrate a fastening system in accordance with one or more exemplary embodiments of the present disclosure.
Figure 2B:
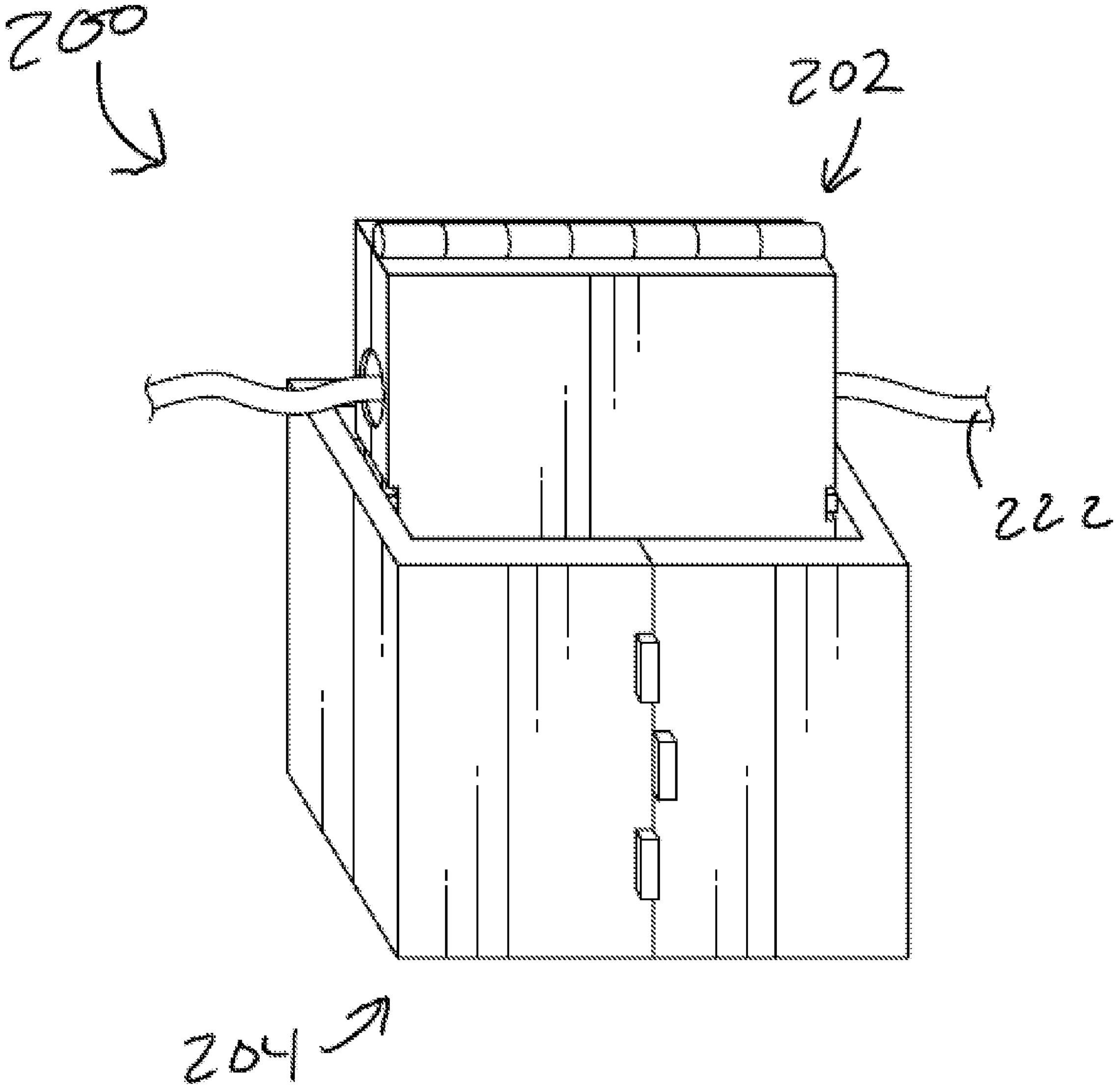
Figure 2C:
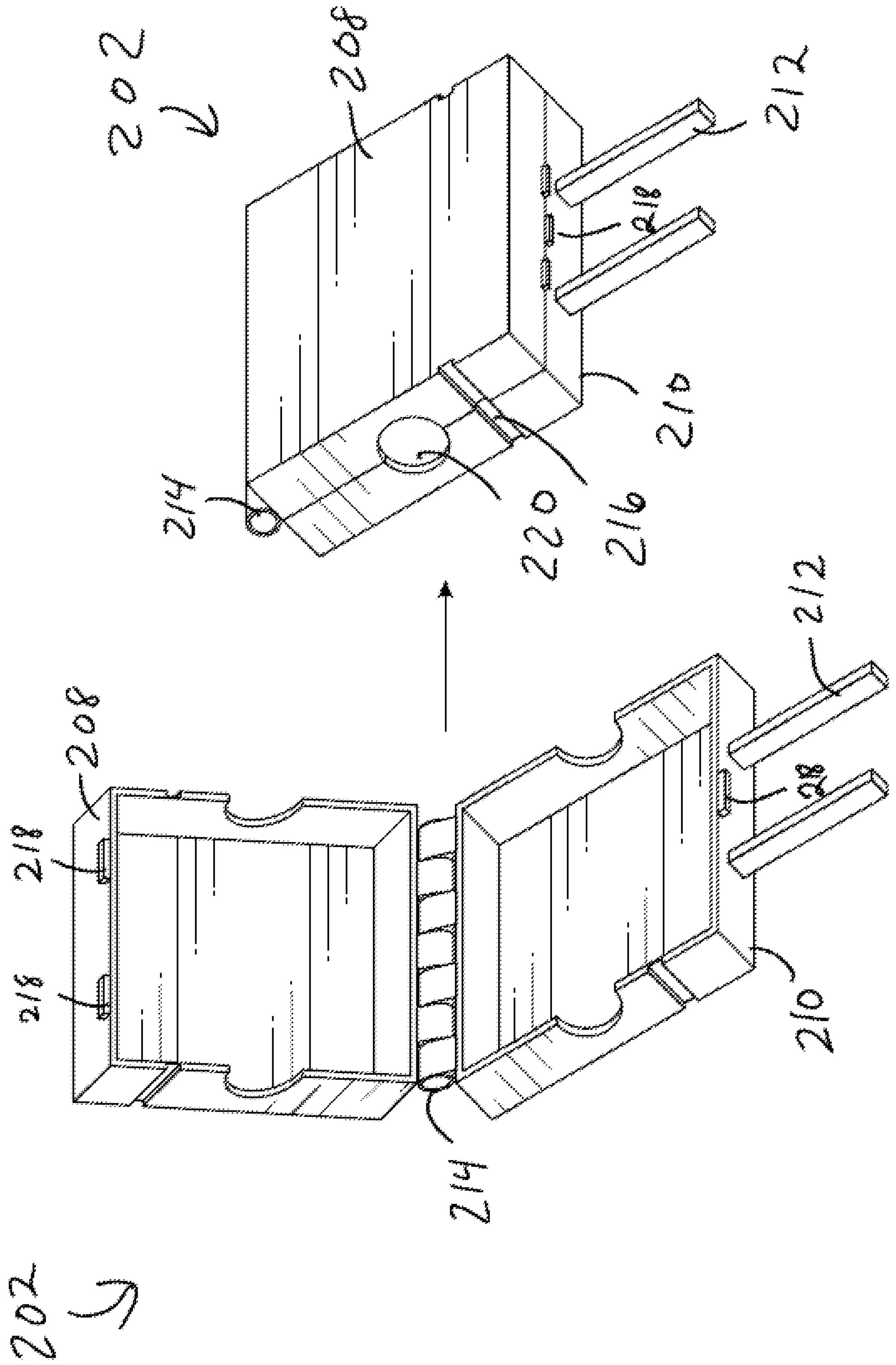
Figure 2D:
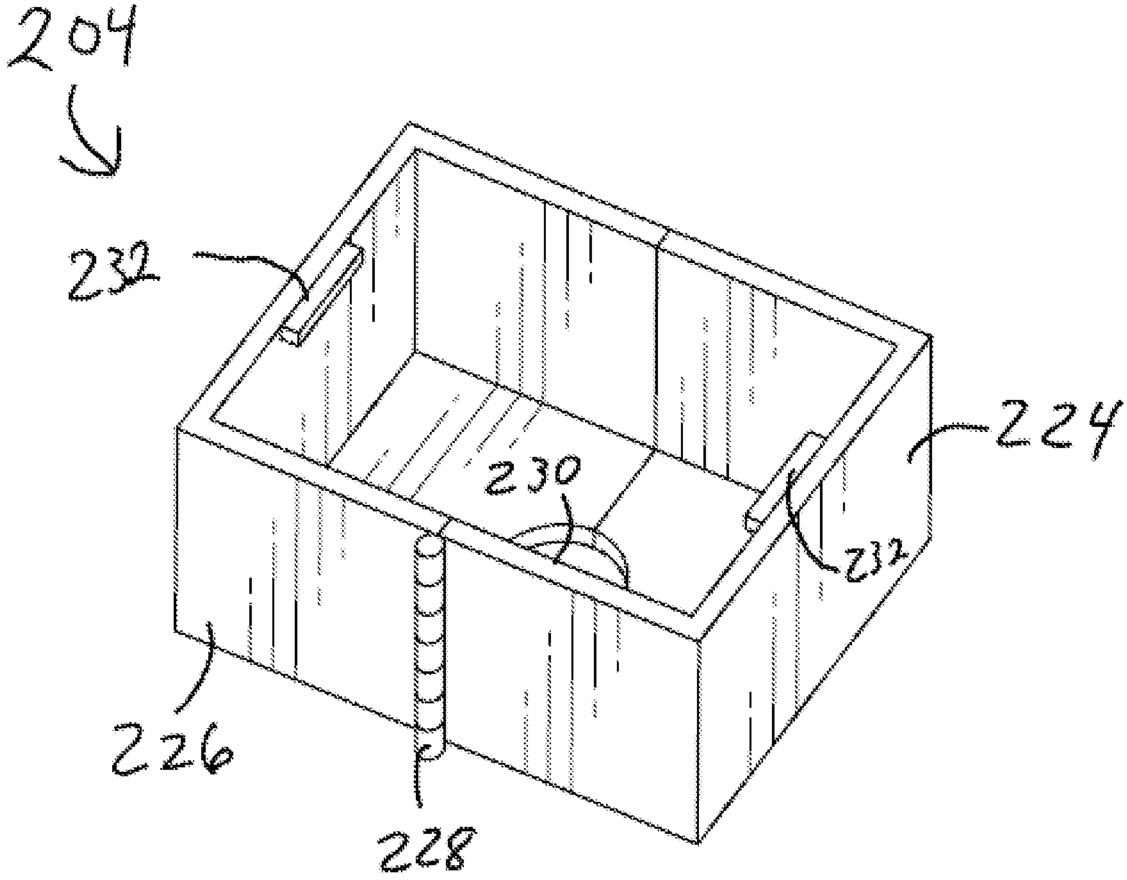
Figure 2E:
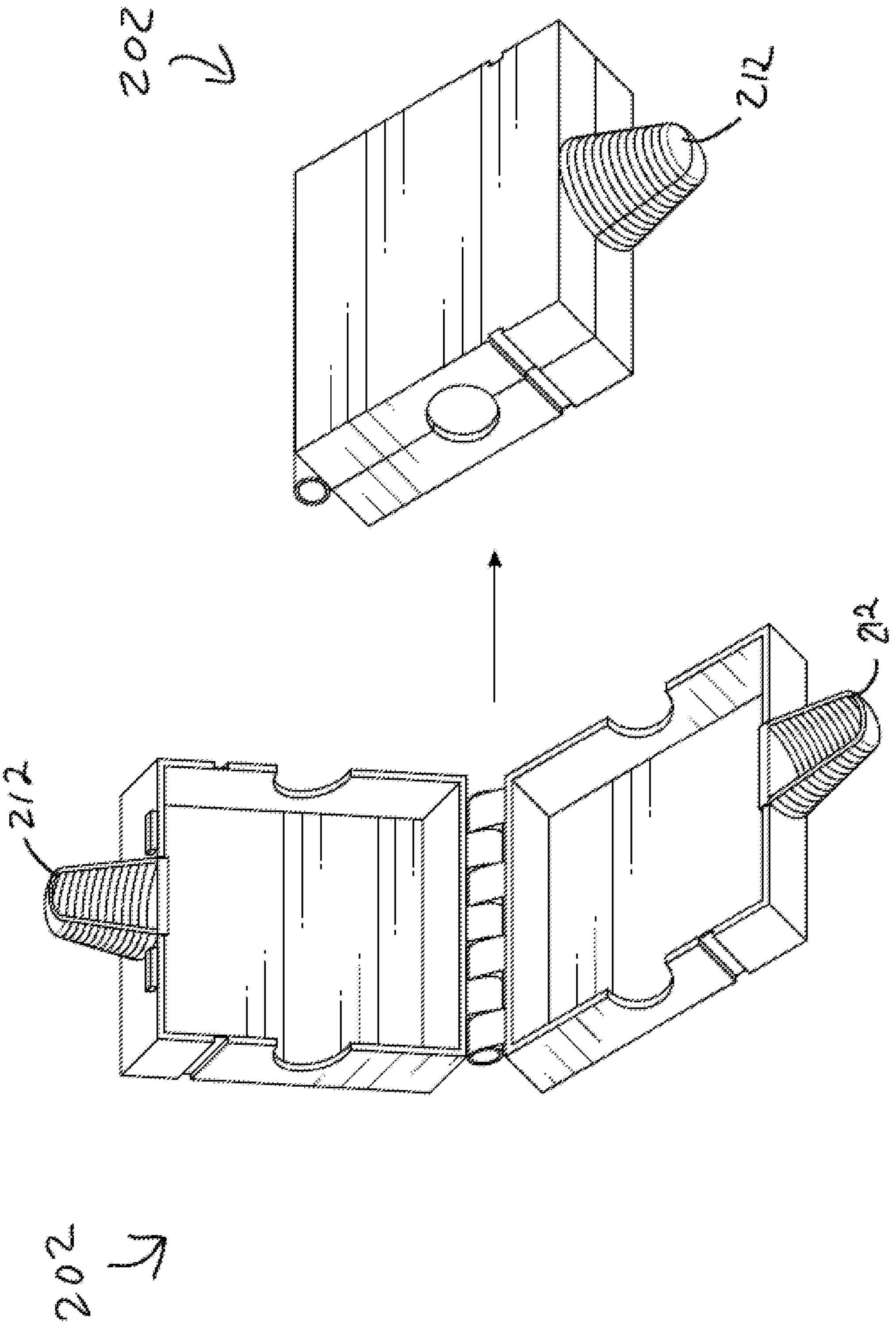

In one embodiment, the first member 202 can include a first portion 208 and a second portion 210. For example, the first portion 208 and the second portion 210 can be connected via a hinge 214, such that the first member 202 can be configured to couple with an elongated member (e.g., elongated member 222). In another embodiment, the first member 202 can include a coupling mechanism 212, such as a coupling mechanism that can connect with an end of such as prongs 212 that can couple with an end of a strand (e.g., end 206). In another embodiment, the coupling mechanism 212 can include, e.g., threads, such as can be seen in FIG. 2E. In another embodiment, the first member 202 can include a fastening member 218 to facilitate the fastening of the first portion 208 to the second portion 210. For example, the fastening member 218 can be a clasp 218, such that the first portion 208 can be secured with the second portion 210, such as when the first member 202 is closed. In another embodiment, the first portion 208 and the second portion 210 can be configured to receive an elongated member, such as elongated member 222. For example, the first member 202 can be configured such that one or more aperture(s) 220 can be disposed in the first member 202, such that an elongated member can traverse therethrough. In one embodiment, each of the first and second portions 208, 210 can shaped and/or configured to form an aperture 220 between the two portions 208, 210 when the first member 202 is closed. In another embodiment, the first member 202 can include a notch 216 or other configuration that can enable the first member 202 to couple with the second member 204. For example, the notch 216 can be configured to receive lips and/or ledges of the second member 204, such that the first member 202 and second member 204 can be coupled with one another. In another embodiment, the notch 216 can be formed via corresponding notches in the first and second portions 208, 210, such as can be seen in FIG. 2C.

In another embodiment, the second member 204 can be configured to couple with the first member 202. In another embodiment, the second member 204 can be configured to receive an elongated member and/or strand, such as an end of a strand that can include, e.g., a connector. For example, the second member 204 can include a first portion 224 and a second portion 226. In another example, the first and second portions 224, 226 can be connected via a hinge 228 such that the second member 204 can be mobilized along the hinge 228. In another embodiment, the second member 204 can include an aperture 230, such that an object can traverse the aperture 230. For example, the second member 204 can open along the hinge 228, such as to receive a strand, and the end of the strand (with, e.g., connector 206) can be received by the second member 204. The aperture 230 can enable the second member 204 to close around the strand and contain the connector 206. In another embodiment, the second member 204 can include lips 232, such as can be configured to correspond to the notches 216 of the first member 202. In this manner, the first and second member 202, 204 can be configured to couple with one another. In another embodiment, the first and second member 202, 204 can be configured to couple with one another via any suitable mechanism, including threads, clasps, clamps, quick-connect, or any other mechanism suitable to enable the first member 202 to couple with the second member 204. In one embodiment, the coupling of an end of a strand with the first member 202, which can be coupled with an elongated portion of the same or different strand, along with the receiving of the strand end and coupled first member 202 by the second member 204, can facilitate the fastening of the strand end to an elongated portion of the same strand, or any other elongated portion, including other strands, branches, ropes, etc.

Figure 2F:
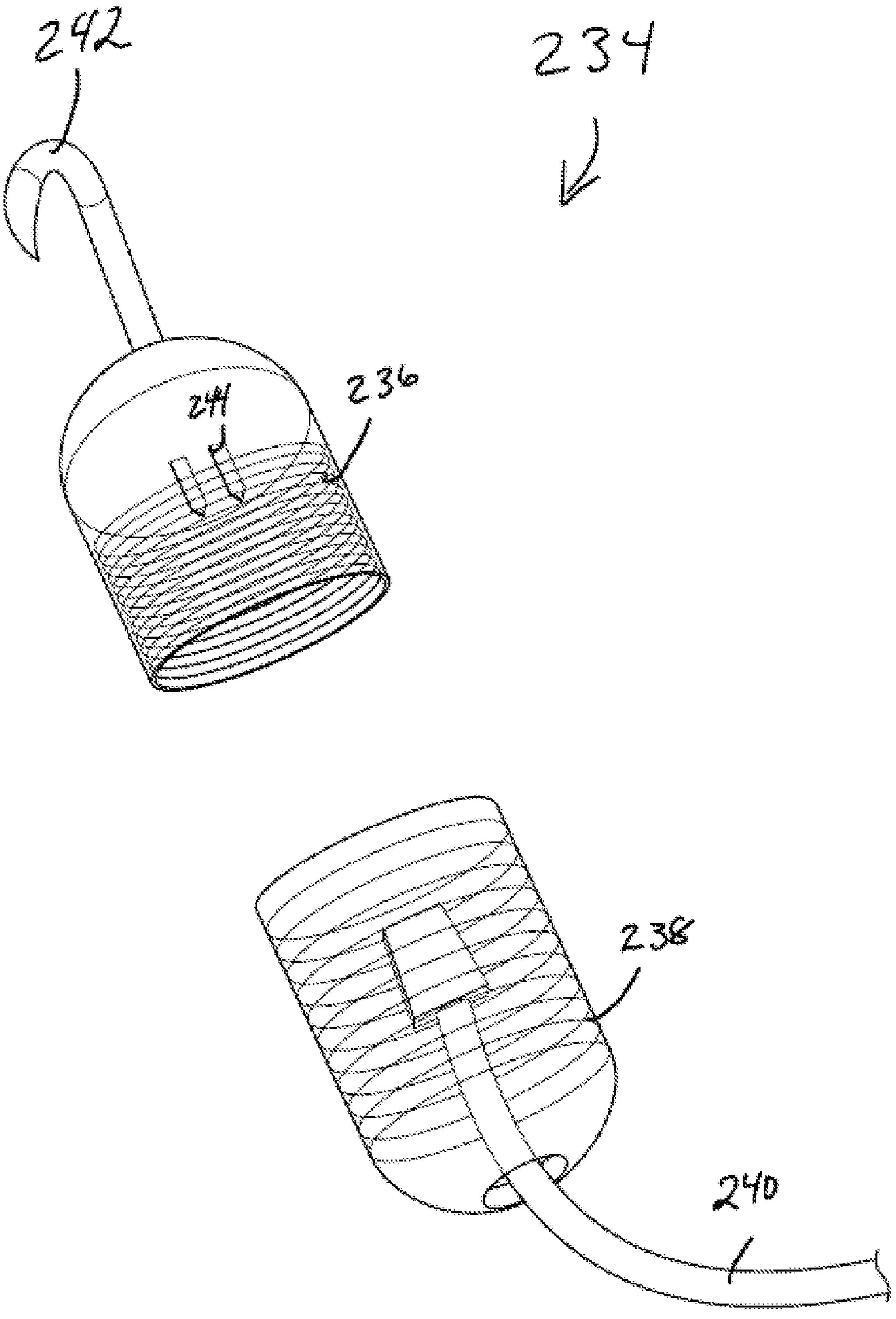
FIGS. 2F-2G illustrate a fastening system in accordance with one or more exemplary embodiments of the present disclosure.
Figure 2G:
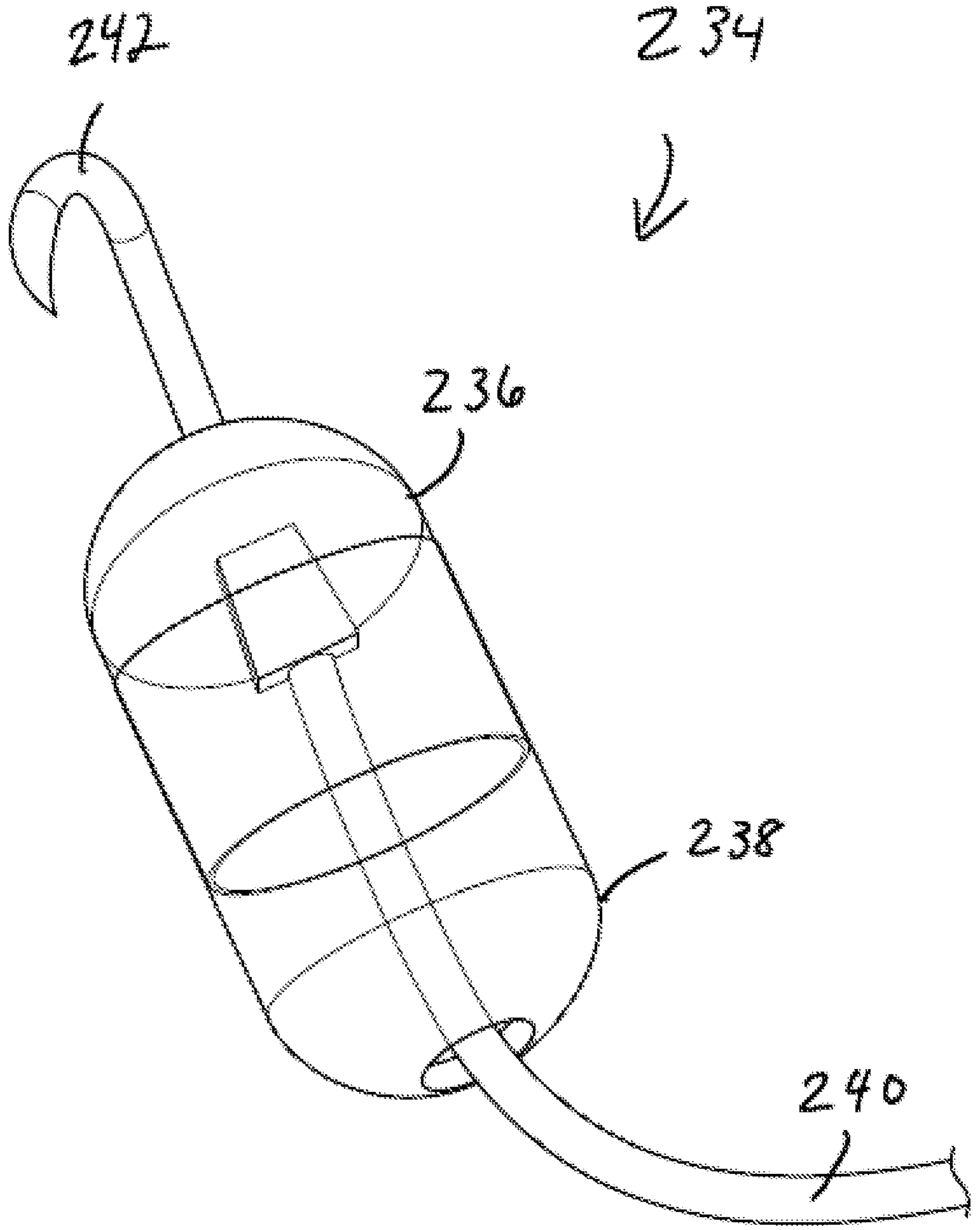

In another embodiment, FIGS. 2F-2G depict another embodiment of the present disclosure. A fastening system 234 can be similar to fastening system 200, differing by, e.g., having a different shape and a different mechanism for attaching the first and second members. For example, the fastening system 234 can include a first member 236 and a second member 238. The first member 236 can be configured to couple with, e.g., a strand, such as via, e.g., a hook 242. In another embodiment, the first member 236 can be configured to couple with, e.g., and end of a strand, such as via prongs 244, or any other suitable coupling mechanism. In another embodiment, the first member 236 can be configured to couple with the second member 238. For example, the members 236, 238 can include threads designed to corresponded with one another to facilitate the attachment of the first and second members 236, 238 with one another. In another embodiment, a strand 240 can be received by the second member 238 (e.g., the second member can open, such as via hinges, or by including separate portions that can detach from one another to facilitate insertion of the strand) and couple with the first member 236.

Figure 2H:
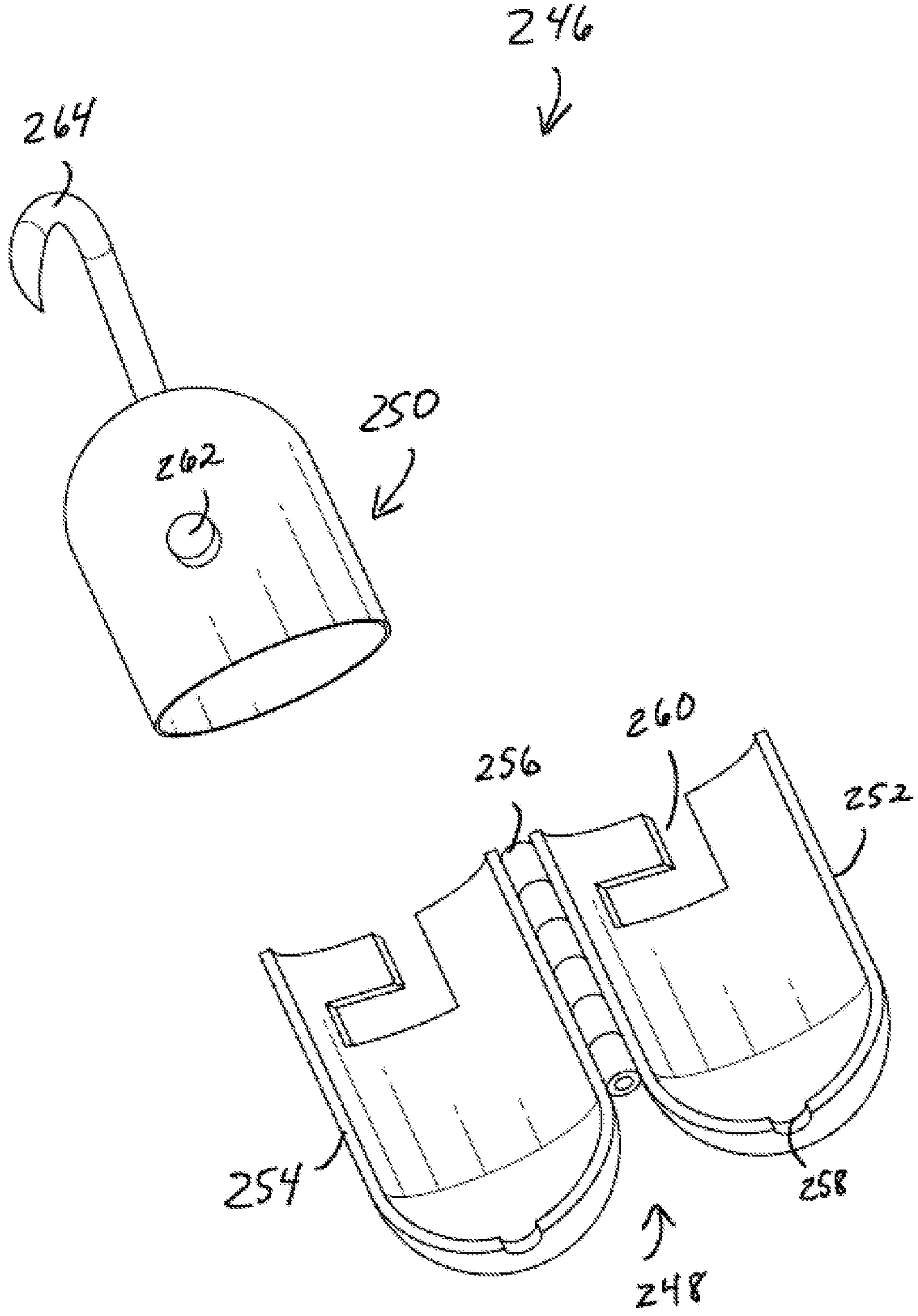
FIGS. 2H-2I illustrate a fastening system in accordance with one or more exemplary embodiments of the present disclosure.
Figure 2I:
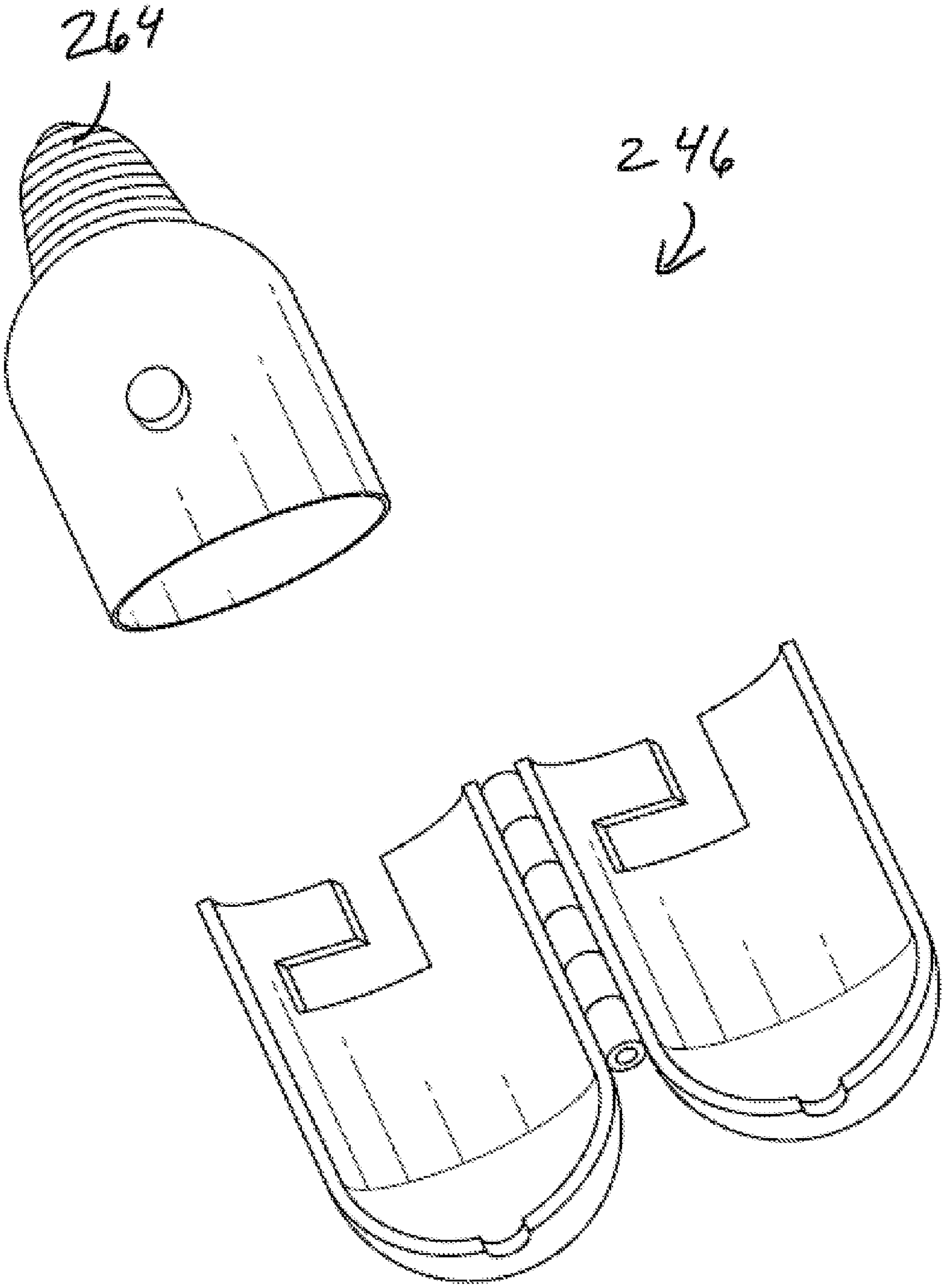

FIGS. 2H-2I depict another embodiment of the present disclosure. A fastening system 246 can be similar to fastening system 200, differing by, e.g., having a different shape and a different mechanism for attaching the first and second members. For example, the fastening system 246 can include a first member 250 and a second member 248. The first member 250 can be configured to couple with, e.g., a strand, such as via, e.g., a hook 242. In another embodiment, the first member 250 can be configured to couple with, e.g., a socket, such as via threads 264. In another embodiment, the first member 250 can be configured to couple with, e.g., an end of a strand, such as via prongs, or any other suitable coupling mechanism. In another embodiment, the first member 250 can be configured to couple with the second member 248. For example, the first member 250 can include a protrusion 262 that can be configured to correspond to a groove 260 and/or notch 260 of the second member 248, such that the second member 248 can receive the first member 250 and be engaged therewith, such as by turning the second member 248 to receive the protrusion 262 within the groove 260, securing the members 250, 248 together. In another embodiment, the second member 248 can include a first portion 252 and a second portion 254, such as can be connected by a hinge 256, such that the second member 248 can be mobilized along the hinge 256 axis. For example, the second member 248 can be opened to receive the first member 250 and/or a strand.

Figure 2J:
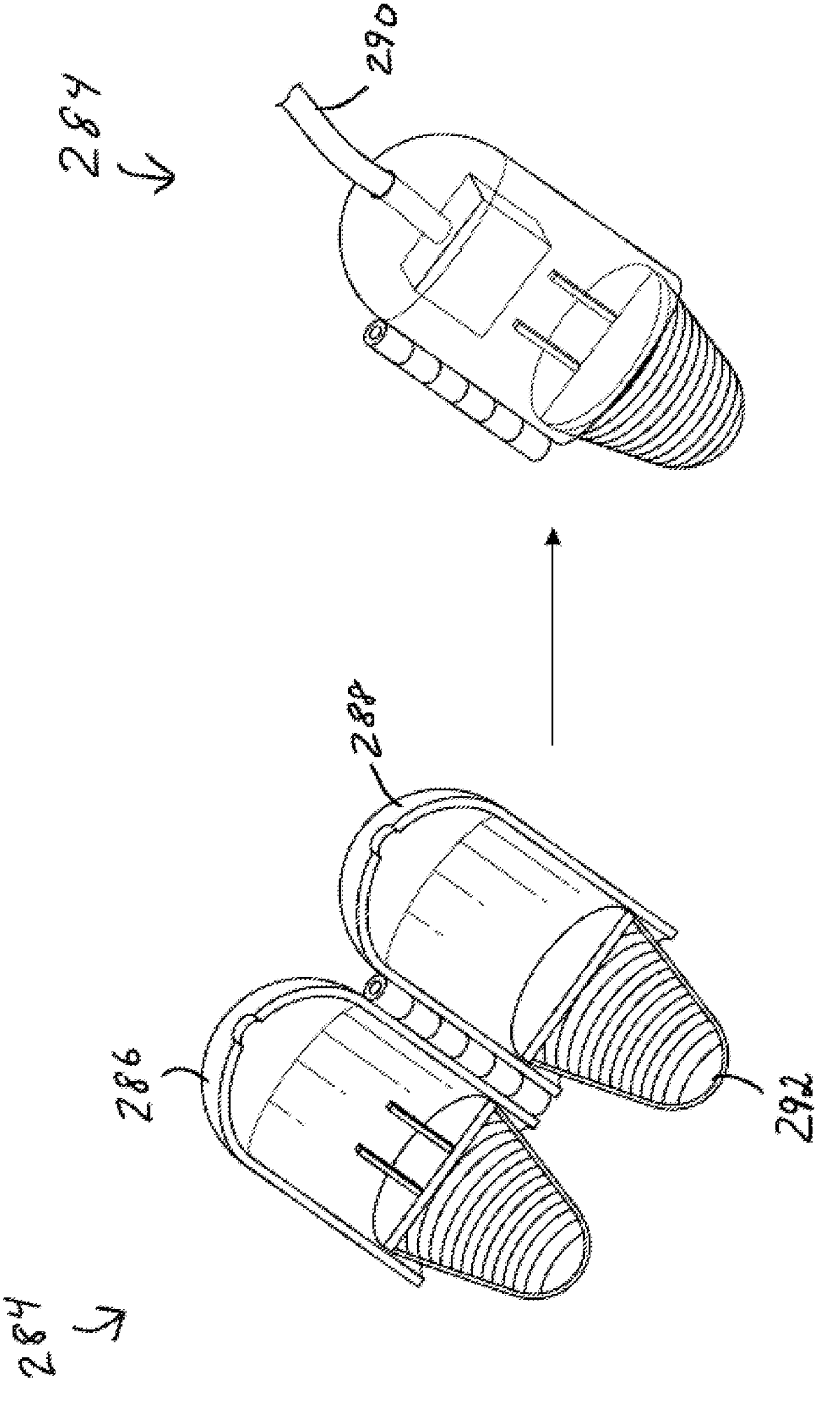
FIG. 2J illustrates a fastening device in accordance with one or more exemplary embodiments of the present disclosure.

FIG. 2J depicts another embodiment of the present disclosure. A fastening device 284 can be similar to the first member 202 of the fastening system 200. In another embodiment, the first portion 202 of the fastening system 200 can be a fastening apparatus, such as apparatus 284. In one embodiment, the apparatus 284 can include a first portion 286 and a second portion 288. The portions 286, 288 can be connected by a hinge. The apparatus 284 can be configured to receive a strand, such as an end of a strand. For example, a connector of a strand at an end of a strand can be received by the apparatus 284 and coupled thereto, such as via a coupling mechanism of the apparatus 284 as depicted in FIG. 2J.

Figure 2K:
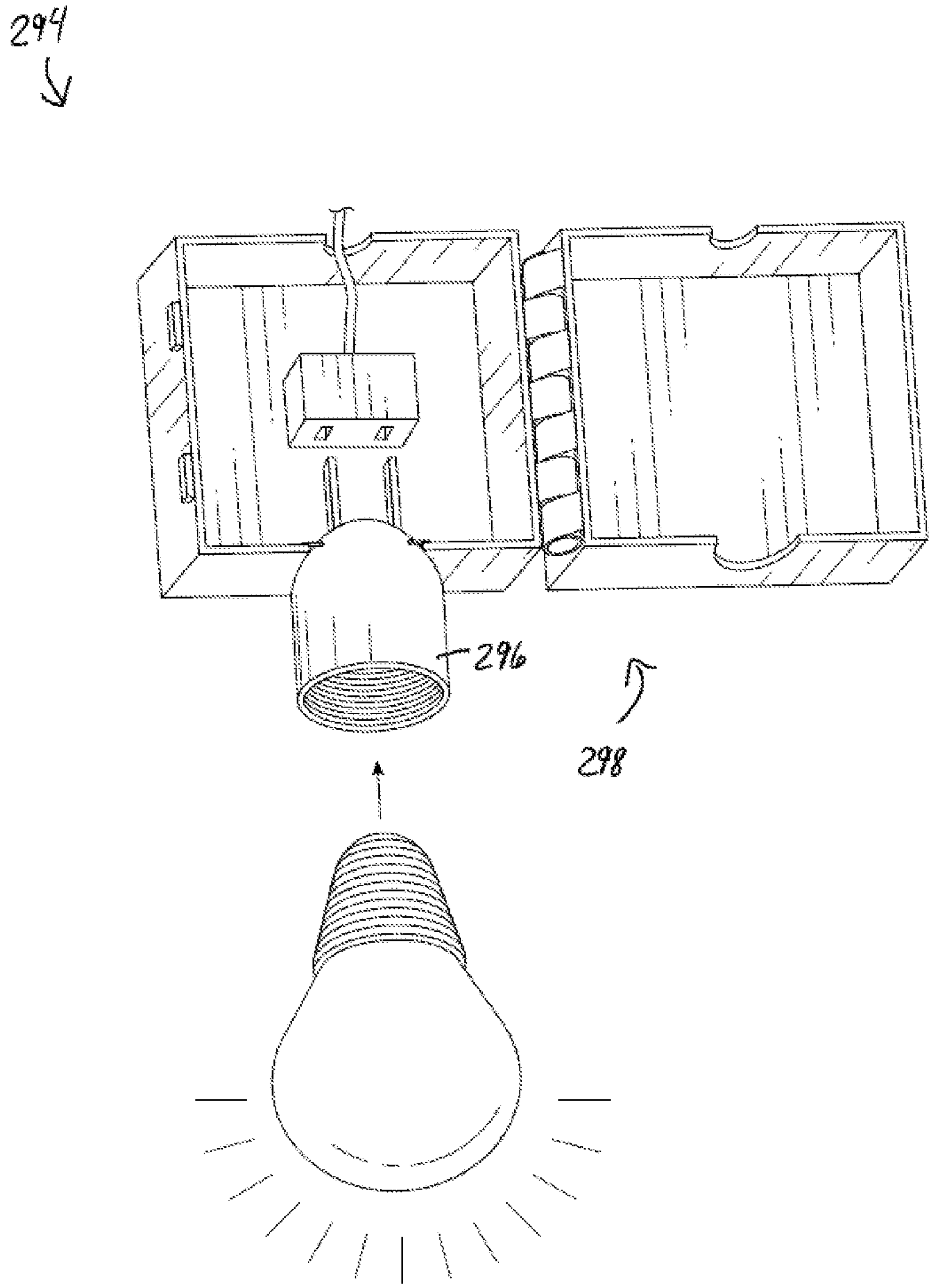
FIG. 2K illustrates a fastening apparatus in accordance with one or more exemplary embodiments of the present disclosure.

FIG. 2K depicts another embodiment of a fastening apparatus. Fastening apparatus 294 can be similar to fastening apparatus 284. In one embodiment, the apparatus 294 can include a first member 298 and a second member 296. For example, the second member 296 can include a socket configured to receive, e.g., a light bulb. In another embodiment, the second member can include a coupling mechanism configured to couple with a strand, such as with an end of a strand via strand connector. In another embodiment, the first member 298 can be hinged, such that the first member 298 can open to receive a strand and/or an end of a strand. In another embodiment, the second member 296 can be configured to conduct electricity, such that, e.g., a light bulb can be powered via a strand connected thereto.

Figure 3:
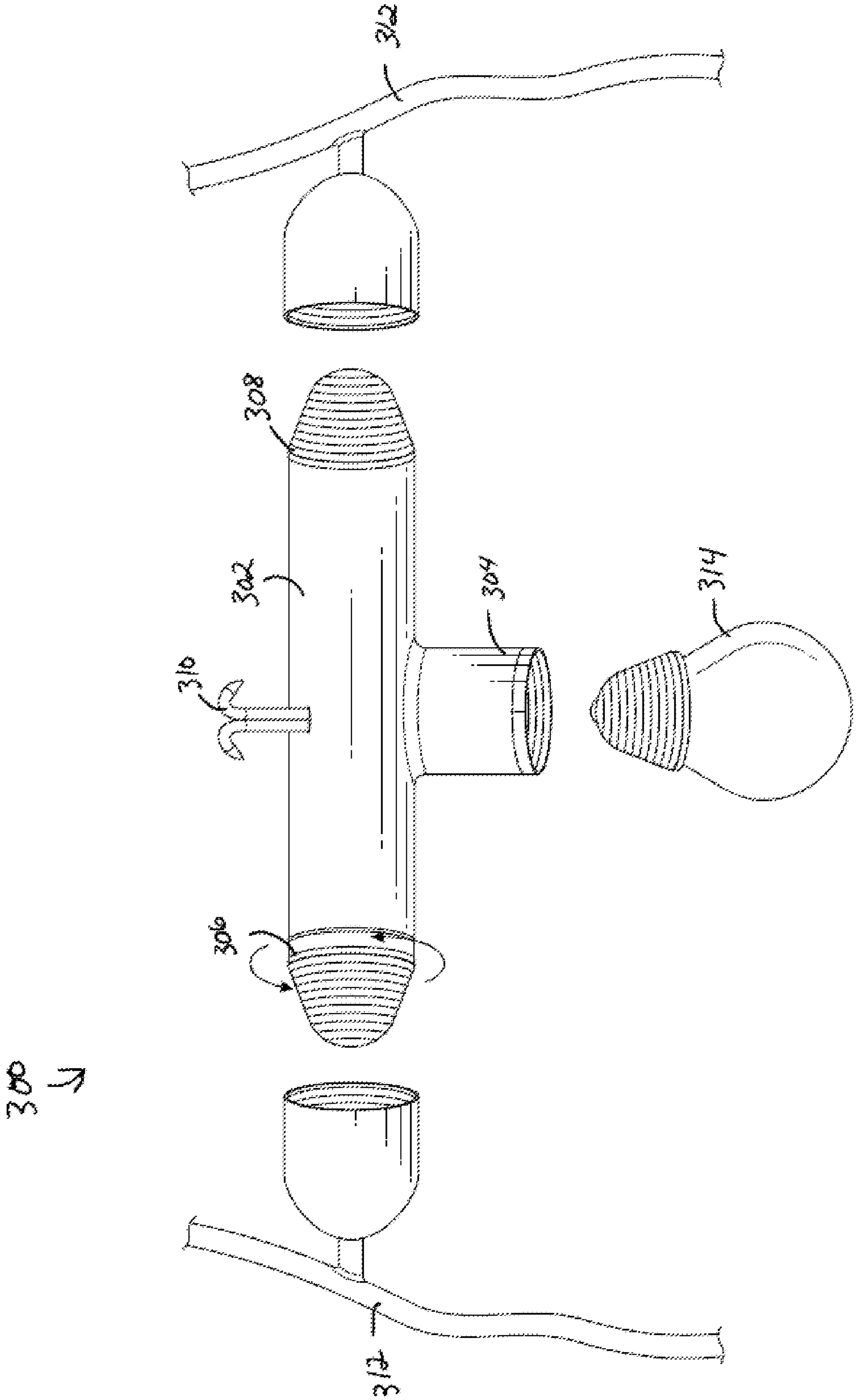
FIG. 3 illustrates a coupling system in accordance with one or more exemplary embodiments of the present disclosure.

FIG. 3 depicts another embodiment of the present disclosure. A coupling system 300 can include a body 302 with a first end 304, second end 306, and third end 308. In another embodiment, the system 300 can include just one end, or, in another embodiment, multiple ends. In one embodiment, the first end 304 can be configured to receive a light bulb. For example, the first end 304 can include a socket, such as to receive a light bulb. In another embodiment, the second end 306 can be configured to engage a socket, such as a socket of a strand 312. For example, the second end 306 can include a coupling mechanism to couple with a strand and/or a socket of a strand. In one embodiment, the coupling mechanism can be threads, such as to screw into a socket. In another embodiment, the second end 306 can be rotatable, such as to facilitate that engaging of the second end 306 within a socket. In another embodiment, the third end 308 can be configured to couple with a strand. For example, the third end 308 can include a coupling mechanism, such as threads that can be configured to engage a socket. In another embodiment, the system 300 can include a fastener 310. In one embodiment, the fastener 310 can be configured to couple to facilitate coupling of the system 300 with, e.g., a strand. In another embodiment, the fastener 310 can be any fastener suitable to couple the system 300 to a surface, strand, tree, elongated member, or any other object. In another embodiment, the fastener 310 can be any fastener suitable to enable the system 300 to couple to an object and support, e.g., one or more strands coupled to the system 300.

Figure 4A:
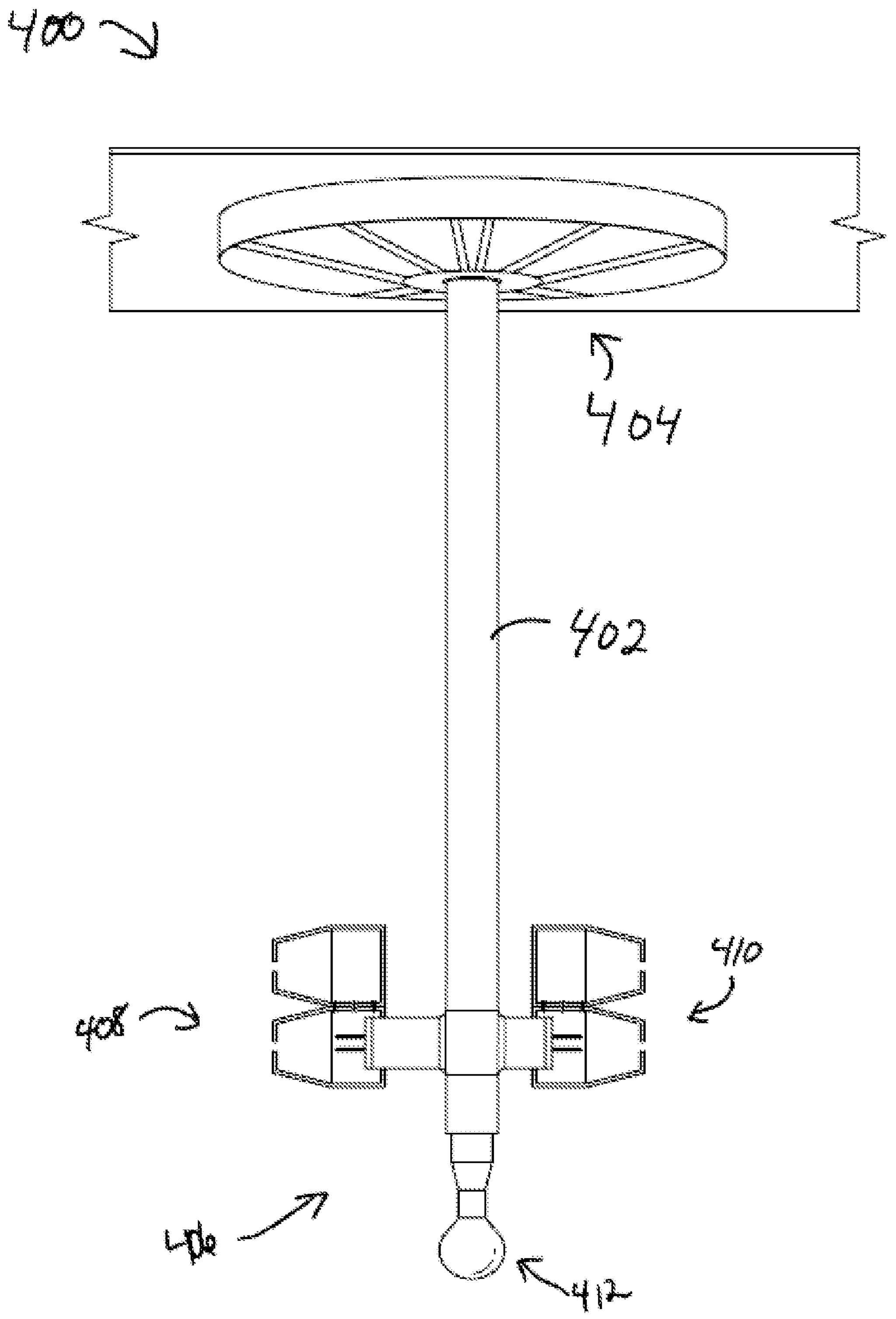
FIGS. 4A-4B illustrate a mounted coupling system in accordance with one or more exemplary embodiments of the present disclosure.
Figure 4B:
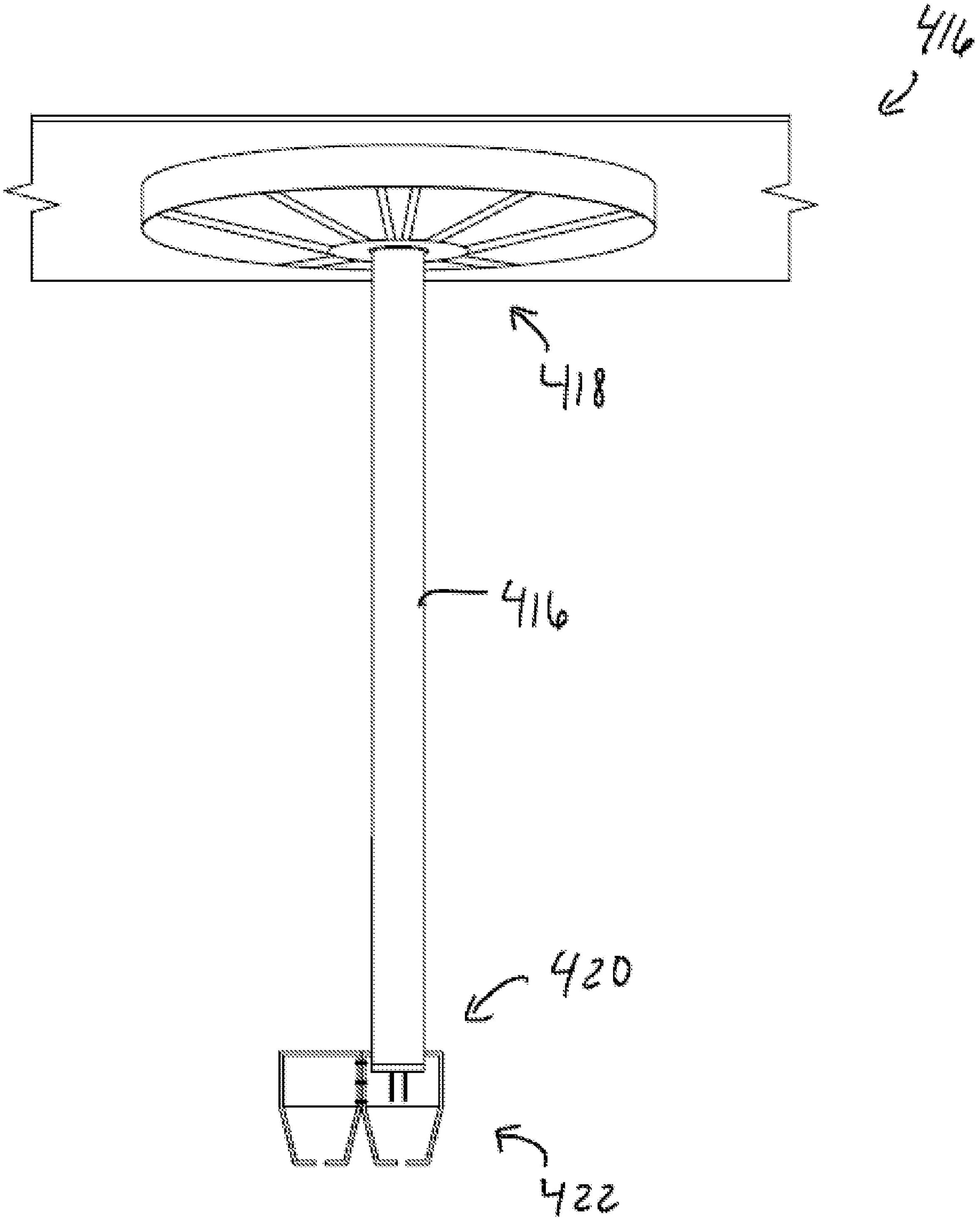

FIG. 4A illustrates a mounted coupling system 400 in accordance with one or more embodiments of the present disclosures. In one embodiment, the system 400 can include a shaft 402 coupled with a mount 404. In one embodiment, the mount 404 can be coupled with a surface, such as, e.g., a ceiling or floor. In another embodiment, the system 400 can include a first end 406 distal the mount 404. In one example, the first end 406 can include a first connector 408 and/or a second connector 410. In one embodiment, the first and/or second connectors 406, 408 can be electrical connectors, such as a male or female electrical connector. In another embodiment, the first end 406 can be configured to provide illumination, such as via a light socket and/or connected light bulb 412. In another embodiment, the first and/or second connector 408, 410 can be configured to secure a connection thereto, such as via one or more hinged members in accordance with the principles of the present disclosure. FIG. 4B illustrates a mounted coupling system 414 in accordance with one or more embodiments of the present disclosures. In one embodiment, the system 414 can include a shaft 416 coupled with a mount 418. In one embodiment, the mount 418 can be coupled with a surface, such as, e.g., a ceiling or floor. In another embodiment, the system 414 can include a first end 420 distal the mount 418. In one example, the first end 420 can include a connector 422. In one embodiment, the connectors 422 can be an electrical connector, such as a male or female electrical connector.

Figure 5:
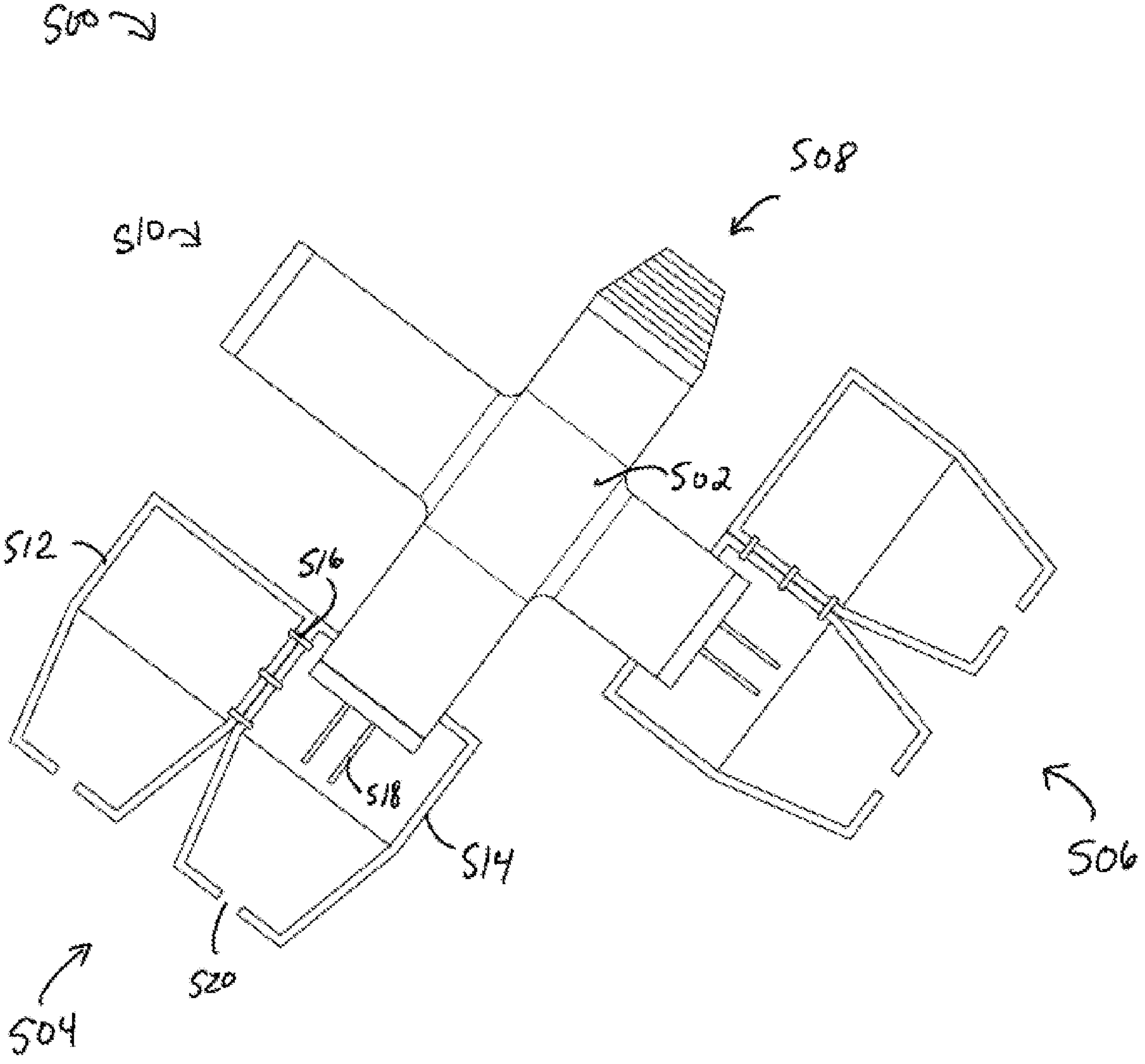
FIG. 5 illustrates a connection apparatus in accordance with one or more exemplary embodiments of the present disclosure.

FIG. 5 depicts another embodiment of the present disclosure. In one embodiment, a connection apparatus 500 can include a body member 502 that can be configured to provide structure to the apparatus 500. In one embodiment, the body member 502 can facilitate transmission of electrical current therethrough, such as to one or more sides of the apparatus 500. In another embodiment, the apparatus 500 can include a first side 504. For example, the first side 504 can include a first connector 518, such as a male or female electrical connector and/or plug. In another example, the first side 504 can include a first securing member 512 coupled with a second securing member 514, such as via a hinge 516. In another embodiment, the first end 504 can be configured to couple with, e.g., an electrical line, such as via connector 518 and securing members 512, 514. For example, securing member 512, 514 can be configured with one or more apertures 520, such that when the securing members 512, 514 abut one another, an orifice can be formed therebetween. In this manner, an electrical line can traverse the securing members 512, 514 to engage with the connector 518. In another embodiment, the apparatus 500 can include a second side 506. In one example, the second side 506 can be configured similar to the first side 504. In another embodiment, the apparatus 500 can include a third side 508. In one embodiment, the third side 508 can be configured to engage, e.g., a light socket. For example, the third end 508 can include threads configured to engage with corresponding threads of a light socket. In another embodiment, the apparatus 500 can include a fourth side 510. In one example, the fourth side 510 can include a light socket, such as to receive a light bulb. The socket can include threads, a quick connect, or any other coupling mechanism suitable to receive a light bulb. The apparatus 500 can be configured receive and/or transmit power from one or more of its sides, or otherwise be configured to terminate and/or not transmit an electrical current to or from any of its sides.

The present disclosure can include a string light system that can include one or more embodiments of the present disclosure. For example, a string light system can include a fastening system, fastening device, string light kit, coupling system, mounted coupling system, and/or connection apparatus as further described herein. It will be understood by those having skill in the art that a string light system in accordance with the principles of the present disclosure can utilize one or more of these elements to enable the securing and/or coupling of string lights to one or more surfaces and/or objects. It will further be understood by those having skill in the art that the systems, devices, and/or apparatuses disclosed herein can be made of any suitable material and/or combination thereof, including metals, plastics, glass, etc.

The apparatuses, systems, and methods disclosed herein can be used to facilitate the coupling of electrical lines (such as, e.g., light strands, electrical cords, Christmas lights, etc.). For example, the present disclosure can facilitate the coupling of electrical lines in illumination displays, such as Christmas light displays, industrial lighting displays, or any other illumination displays that utilize exposed and/or semi-exposed electrical lines. In another embodiment, the present disclosure provides novel methods and/or systems for securing electrical lines, such as to one another or to other surfaces. In another embodiment, the present disclosure leverages existing electrical line components and/or designs to achieve coupling of electrical lines or other objects and/or surfaces.

The present disclosure achieves at least the following advantages:

1. Facilitating the coupling of electrical lines to surfaces and objects;
2. Enabling the installation of illumination displays;
3. Enabling the securement of electrical lines in illumination displays;
4. Providing a way to securely couple an electrical line to itself or to another electrical line.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words “means for” or “step for” are explicitly used in the particular claim, followed by a participle phrase identifying a function. Use of terms such as (but not limited to) “mechanism,” “module,” “device,” “unit,” “component,” “element,” “member,” “apparatus,” “machine,” “system,” “processor,” “processing device,” or “controller” within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A fastening system comprising:

a first member and a second member, wherein the first member includes:

a first portion connected with a second portion via a hinge, a coupling mechanism configured to couple with a strand, and a fastening member configured to fasten the first portion to the second portion, wherein the first and second portions form an aperture between the first and second portions when the first member is closed via the hinge, wherein the first portion and the second portion are configured to receive a first elongated member within the aperture, wherein the second member includes:

a first portion connected with a second portion via a hinge, and an aperture configured to receive a second elongated member within the aperture, wherein the first member is configured to couple with the second member, and wherein the second member is configured to couple with the first member.

2. The fastening system of claim 1, wherein the coupling mechanism of the first member comprises prongs.

3. The fastening system of claim 1, wherein the coupling mechanism of the first member comprises threads.

4. The fastening system of claim 1, wherein the coupling mechanism of the first member comprises a hook.

5. The fastening system of claim 1, wherein the first member is configured to couple with the second member via a notch.

6. The fastening system of claim 1, wherein the second member is configured to couple with the first member via lips.

7. The fastening system of claim 1, wherein the first member is configured to couple with the second member, and the second member is configured to couple with the first member, via threads.

8. The fastening system of claim 1, wherein the first member is configured to couple with the second member via a protrusion, and the second member is configured to couple with the first member via a groove configured to receive the protrusion.

9. The fastening system of claim 1, wherein the second elongated member comprises a strand.

10. The fastening system of claim 1, wherein the second elongated member comprises a strand including a connector.

* * * * *